W. F. STOCKFORD.
FISHING REEL.
APPLICATION FILED FEB. 16, 1910.
975,653.
Patented Nov. 15, 1910.
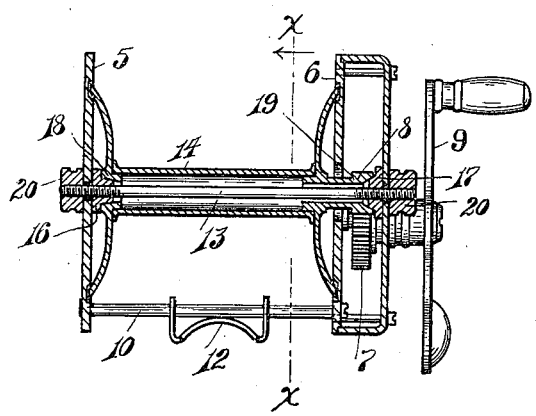
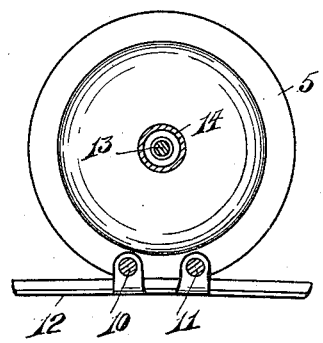
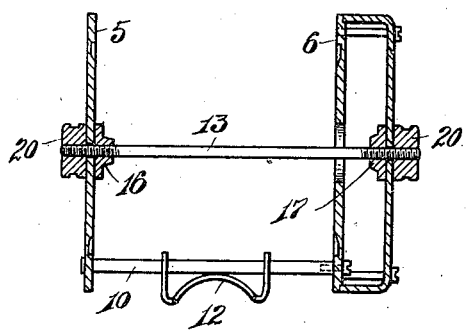
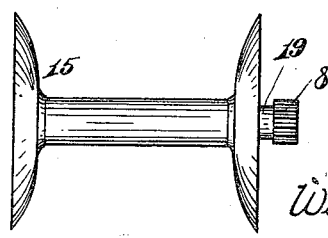
Witnesses:
G. M. Cole.
L. D. Wahlen.
William F. Stockford.
Inventor.
By George G. Oltsch.
Attorney.

UNITED STATES PATENT OFFICE.

WILLIAM F. STOCKFORD, OF SOUTH BEND, INDIANA.

FISHING-REEL.

975,653.

Specification of Letters Patent. Patented Nov. 15, 1910.

Application filed February 16, 1910. Serial No. 544,285.

*To all whom it may concern:*

Be it known that I, WILLIAM F. STOCKFORD, a citizen of the United States, residing at South Bend, in the county of St. Joseph and State of Indiana, have invented certain new and useful Improvements in Fishing-Reels, of which the following is a specification.

This invention relates to fishing reels, and has special reference to improvements upon the frame with a view to reducing the number of stay or cross rods ordinarily employed for connecting the reel heads, and thus reduce the number of parts as well as the cost of manufacture.

A further object of the invention is to eliminate the cross or stay rods usually located at the top and sides of the reel, so as to provide a reel, the spool of which will be open and unobstructed.

Another object of the invention is the provision of means whereby the reel heads, aside from the cross rods connecting the bottom of such heads, will have but a single connecting element to properly hold the heads in spaced relation.

Another object of the invention is to simplify the structure and assembling and adjustment of the reel parts, to the end that one part will so coöperate with another as to rigidly and fixedly lock each part in proper relation. In other words, so arrange the parts in relation to each other as to have a secondary function, thereby making for simplicity of construction and the use of the minimum number of parts.

With the above and other objects in view, the present invention consists in the combination and arrangement of parts hereinafter more fully described, illustrated in the accompanying drawings, and particularly pointed out in the claims, it being understood that changes may be made in the form, proportion, size and minor details without departing from the spirit or sacrificing any of the advantages of the invention.

In the drawings:—Figure 1 is a longitudinal sectional view of the complete reel. Fig. 2 is a cross-sectional view taken on the line $x$—$x$ of Fig. 1. Fig. 3 is a longitudinal sectional view of the reel frame, with the spool and driving mechanism removed. Fig. 4 is a side elevation of the spool.

Referring now more particularly to the accompanying drawings, the reference characters 5 and 6 indicate oppositely disposed reel heads, forming part of the frame work of the reel, the latter being provided with the usual chamber in which a gear wheel 7, adapted to mesh with the pinion 8, on the spool is mounted, and a crank handle 9 connecting with the gear with which to operate the spool.

In order to properly hold the heads 5 and 6 in proper spaced relation, so as not to bind the spool and prevent free rotation thereof, and in order to also dispense with the use of the large number of cross stay rods commonly used for the purpose, I connect the heads at their bottom edges by the stay rods 10 and 11 in the usual manner and upon which a base or clamping plate 12 for clamping the reel to a rod is mounted. In lieu of the stay rods commonly employed at the top and sides of the reel, I employ a single stay rod 13, which connects the centers of the heads and is located within the barrel 14 of the spool 15, being thus unexposed and leaving the spool open and unobstructed on all sides, with the exception of the point at which the stay rods upon which the clamping plate is mounted are located.

The central stay rod is threaded at both ends to receive cone bearings 16 and 17 having threaded bores, and permit adjustment of said bearings upon the rod. The spool 15 is provided with hub extensions 18 and 19, having a central bore of a size sufficient to permit the central stay rod to be passed therethrough, the outer portions of such bores having a flaring formation, adapted to receive the cone bearings 16 and 17, which may be adjusted to a nicety with relation to the spool hubs, so as to obtain a free and easy running spool. The said bearings, in addition to their natural function, also serve to hold the reel heads in proper spaced relation, that is—against movement toward each other, as plainly shown in Fig. 3. After the nuts 20 are tightened so as to cause the reel heads to firmly contact with the said bearings, the heads are caused to serve as a jam lock for the bearings, and thus prevent their accidental displacement, the bearings and heads thus serving a double function, all parts of the frame being securely and rigidly locked in proper relation to each other. It is this simplicity of structure and advantageous results obtained by the use of a small number of parts, which constitutes an important feature of my invention.

The hub extension 19 has the pinion 8 preferably formed integral therewith, in order to reduce the number of distinct parts necessary to be handled in assembling and disassembling the reel.

It is obvious that the use of a center stay rod in the manner shown and described, not only serves the same purpose as the greater number of stay rods usually employed, but has the resultant advantage of producing an open and unobstructed spool. In bait casting, the line, when a back lash or over-running of the spool occurs, will contact with the stay rods which surround the spool, and thus tend to entangle and knot up the line to a much greater extent than when no obstruction is present. It is to overcome this objectionable feature, that I have constructed my reel so as to greatly reduce the number of stay rods commonly employed, as well as to obtain the other advantages heretofore referred to.

What is claimed is:—

1. A fishing reel comprising a frame having oppositely disposed head members connected near their lower edges, a central stay rod passing through apertures in said heads, a spool mounted on said stay rod having bearings at the ends of its hollow barrel, bearings mounted on the stay rod and adapted for obtaining the proper adjustment between the same and the spool bearings and the spool disks and head members by a single adjustment, and means for clamping the head members against the adjustable bearings to prevent movement thereof.

2. A fishing reel comprising a frame having oppositely disposed head members connected near their lower edges, a central stay rod passing through apertures in said head members, a spool mounted on the stay rod between said head members and having bearings formed at the ends of its hollow barrel, adjustable bearings mounted on the stay rod and engaging the spool bearings and the head members with their opposite ends to hold the head members in spaced relation with the spool disks, and means for clamping the head members against the adjustable bearings to hold the same against movement.

In testimony whereof I affix my signature, in presence of two witnesses.

WILLIAM F. STOCKFORD.

Witnesses:
　GEORGE OLTSCH,
　GRACE M. COLE.